Feb. 10, 1959          M. E. WOOD          2,872,831
BELT DRIVE FOR MULTIPLE SPINDLE TRACTOR ATTACHMENTS
Filed Jan. 2, 1958          2 Sheets-Sheet 1
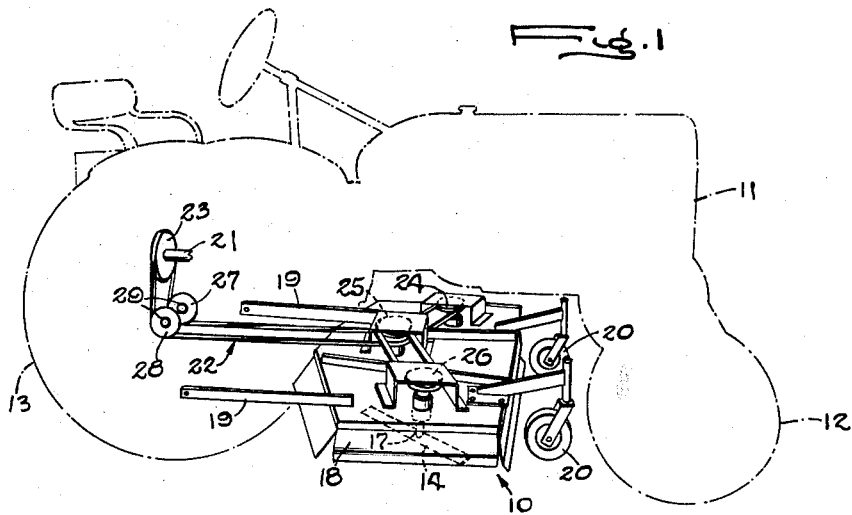
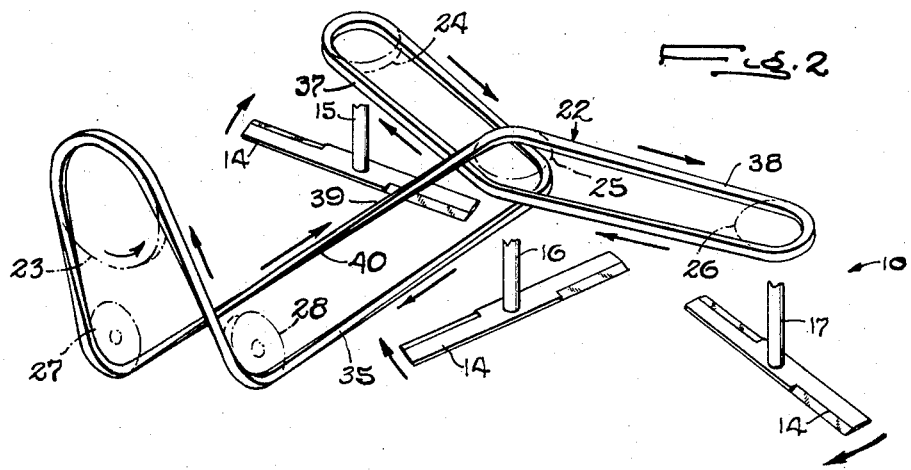
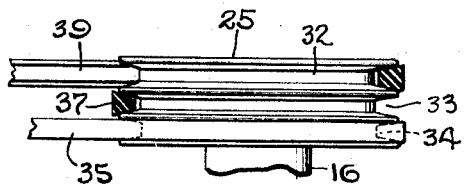
INVENTOR
Mervel E. Wood
ATTORNEYS

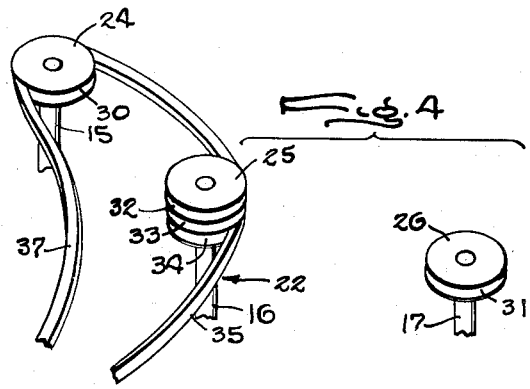
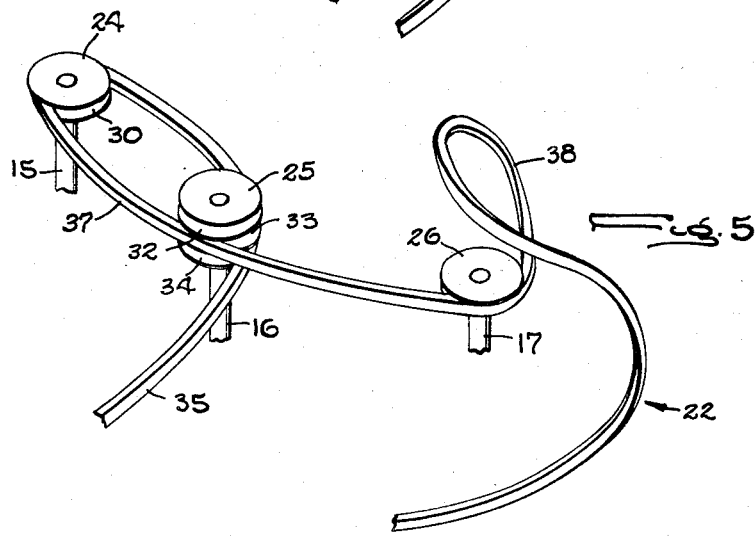
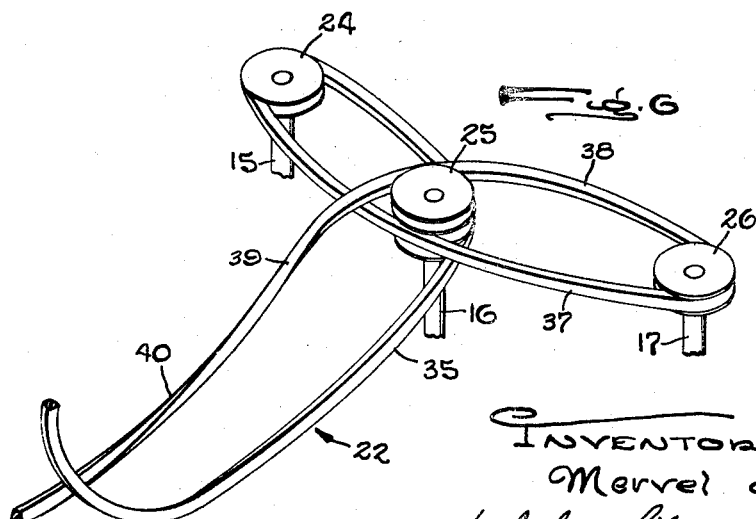

United States Patent Office 2,872,831
Patented Feb. 10, 1959

2,872,831

BELT DRIVE FOR MULTIPLE SPINDLE TRACTOR ATTACHMENTS

Mervel E. Wood, Oregon, Ill., assignor to Wood Brothers Manufacturing Company, Oregon, Ill., a corporation of Illinois Application January 2, 1958, Serial No. 706,814

9 Claims. (Cl. 74—665)

This invention relates to a mechanism for driving a cutter assembly which is adapted to be attached beneath a tractor between the front and rear wheels thereof and which is driven from the power take-off of the tractor. More particularly, the invention relates to a cutter assembly which includes three blades mounted on individual vertical spindles which are journaled on the frame of the cutter assembly. The spindles of such a cutter assembly usually are driven by a belt which extends around a pulley on the horizontal take-off shaft of the tractor and around idler pulleys which are disposed beneath the first pulley and are mounted on a shaft extending transversely of the power take-off shaft.

The principal object of the invention is to provide in a cutter assembly of the above character a novel arrangement of a belt drive by which all three spindles are driven in synchronism from the power take-off of the tractor through a single belt.

The invention also resides in the novel construction and arrangement of pulleys mounted on the cutter spindles, the relationship of these pulleys with the idler and power take-off pulleys and in the manner in which the driving belt is extended around the pulleys.

Other objects and advantages of the invention will become apparent from the following detailed description taken in connection with the accompanying drawings, in which:

Figure 1 is a perspective view of a tractor with a cutter assembly driven by the novel belt drive of the present invention, the tractor being shown in phantom.

Fig. 2 is a schematic perspective view of the belt drive.

Fig. 3 is an enlarged fragmentary view of the pulley mounted on one of the cutter spindles.

Figs. 4, 5 and 6 are schematic perspective views of the pulleys mounted on the cutter spindles and shows the manner in which the belt is extended around these pulleys.

As shown in the drawings for purposes of illustration, the belt drive of the present invention is adapted for use with a cutter assembly 10 which is adapted to be attached to a tractor 11 underneath the latter and between the front wheels 12 and the rear wheels 13 of the tractor. Herein, the cutter assembly includes three flat cutting blades 14 (Fig. 2) which are disposed in a generally horizontal plane and which are fast on the lower ends of individual spindles 15, 16 and 17. The latter are generally vertical and are journaled in a sheet metal frame or housing 18 which is detachably connected to the tractor through the medium of horizontal bars 19. At their rear ends, the bars are pivotally connected to the tractor frame to permit the cutter assembly to be swung down into the operative position, the frame 18 being supported in this position by small wheels 20 which are carried by the frame and engage the ground.

In order to turn the cutter blades 14 from the horizontal power take-off shaft 21 of the tractor, a belt drive 22 transmits the turning of the shaft 21 to the spindles 15, 16 and 17 through a pulley 23 mounted on the shaft 21 and pulleys 24, 25 and 26 mounted on the respective spindles. Parallel idler pulleys 27 and 28 are disposed beneath the pulley 23 and are journaled on the tractor frame on the shafts 29 to turn about an axis which extends transversely of the power take-off shaft 21. As shown in Figs. 1 and 2, the idler pulleys are spaced apart a distance generally equal to the diameter of the pulley 23 and are disposed with their rear edges in the plane of this pulley and with their lower edges in the plane of the pulleys 24, 25 and 26 so that the belt drive 22 can make a right angle turn between the driving pulley 23 and the driven pulleys on the cutter spindles.

The present invention contemplates a novel cooperation of the pulleys 24, 25 and 26 with the idler pulleys 27 and 28 and the driving pulley 23 together with a novel arrangement of the belt drive 22 so that all three of the cutter spindles 15, 16 and 17 are driven in synchronism from the power take-off shaft 21 by a single belt. This is achieved by extending the belt 22 around all three of the pulleys 24, 25 and 26 and by placing a single twist in a slack portion of the belt so that, in spite of this twist, the belt is not subjected to excessive wear.

As shown in Figs. 4, 5 and 6, the pulleys 24 and 26 are formed with single grooves 30 and 31 respectively while the pulley 25 on the intermediate spindle 16 is formed with three grooves 32, 33 and 34. The belt 22 extends over the driving pulley 23, then down around the idler pulley 28 and horizontally toward the intermediate driven pulley 25 as indicated at 35 (Figs. 2 and 4). This portion is received in the lowest groove 34 of the pulley 25 and extends around the groove 30 of the pulley 24, a section 37 of the belt extends across the intermediate groove 33 of the pulley 25 and is received in the groove 31 of the pulley 26 (Fig. 5). The next section 38 (Fig. 6) extends from the pulley 26 and into the top groove 32 of the pulley 25. Finally, the belt extends horizontally from the pulley 25 to the idler pulley 27 as indicated at 39 and then around this idler pulley to the driving pulley 23.

Transversing the belt 22 in the manner described above is permitted by placing a single twist 40 in the belt. This twist is located in the section 39 of the belt between the intermediate driven pulley 25 and the idler pulley 27. The power take-off shaft 21 is driven to turn the driving pulley 23 counterclockwise as viewed in Fig. 2. This advances the belt 22 in the direction indicated by the arrows so that belt section 39 with the twist 40 is a slack portion of the belt. In this way, the twist 40 is not under appreciable tension and it does not, therefore, produce excessive wear of the belt.

It will be observed that the novel drive mechanism of the present invention permits all three cutter blades 14 to be driven in synchronism by a single belt 22. In spite of the fact that the belt has a twist 40 in it any wear resulting from the twist is minimized by placing it in the slack portion 39 of the belt so that the service life of the belt is as long as it would be with conventional drives.

I claim as my invention:

1. For use with a tractor having a horizontal power driven shaft, a vertical driving pulley secured to said shaft and two laterally spaced idler pulleys mounted on a shaft extending transversely of said power driven shaft and disposed beneath said driving pulley, the combination of, a frame adapted to be attached to said tractor, first and second vertical spindles, an intermediate vertical spindle disposed between said first and second spindles, means journaling said three spindles on said frame, first, second and intermediate horizontal driven pulleys mounted respectively on said first, second and intermediate spindles, said driven pulleys being disposed in a common plane generally alined with said idler pulleys, said first and second driven pulleys having a belt receiving groove formed therein and said intermediate driven pulley having three belt receiving grooves formed thereon, an endless belt extending around said driving pulley, around a first one of said idler pulleys, around a first one of said grooves in said intermediate driven pulley, around the groove in said first driven pulley, across a second one of said grooves in said intermediate pulley, around the groove in said second driven pulley, back around the third groove in said intermediate pulley, around the other idler pulley, and back to said driving pulley, said belt being twisted along the section extending between said intermediate pulley and said other idler pulley, and means for turning said driving pulley in a direction to advance said belt from the driving pulley toward said other idler pulley whereby the twist is in a slack portion of the belt.

2. For use with a tractor having a horizontal power driven shaft, a vertical driving pulley secured to said shaft and two laterally spaced idler pulleys mounted on a shaft extending transversely of said power driven shaft and disposed beneath said driving pulley, the combination of, a frame adapted to be attached to said tractor, first and second vertical spindles, an intermediate vertical spindle disposed between said first and second spindles, means journaling said three spindles on said frame, first, second and intermediate horizontal driven pulleys mounted respectively on said first, second and intermediate spindles, said driven pulleys being disposed in a common plane generally alined with said idler pulleys, said first and second driven pulleys having a belt receiving groove formed therein and said intermediate driven pulley having three belt receiving grooves formed thereon, and an endless belt extending around said driving pulley, around a first one of said idler pulleys, around a first one of said grooves in said intermediate driven pulley, around the groove in said first driven pulley, across a second one of said grooves in said intermediate pulley, around the groove in said second driven pulley, back around the third groove in said intermediate pulley, around the other idler pulley and back to said driving pulley, said belt being twisted along the section extending between said intermediate pulley and said other idler pulley.

3. For use with a tractor having a horizontal power driven shaft, a vertical driving pulley secured to said shaft and two laterally spaced idler pulleys mounted on a shaft extending transversely of said power driven shaft and disposed beneath said driving pulley, the combination of, a frame adapted to be attached to said tractor, first and second vertical spindles, an intermediate vertical spindle disposed between said first and second spindles, means journaling said three spindles on said frame, first, second and intermediate horizontal driven pulleys mounted respectively on said first, second and intermediate spindles, said driven pulleys being disposed in a common plane generally alined with said idler pulleys, said first and second driven pulleys having a belt receiving groove formed therein and said intermediate driven pulley having three belt receiving grooves formed thereon, and an endless belt extending around said driving pulley, around a first one of said idler pulleys, around a first one of said grooves in said intermediate driven pulley, around the groove in said first driven pulley, across a second one of said grooves in said intermediate pulley, around the groove in said second driven pulley, back around the three grooves in said intermediate pulley, around the other idler pulley and back to said driving pulley.

4. For use with a tractor having a horizontal power driven shaft, a vertical driving pulley secured to said shaft and two laterally spaced idler pulleys mounted on a shaft extending transversely of said power driven shaft and disposed beneath said driving pulley, the combination of, a frame adapted to be attached to said tractor, a first vertical spindle, a second vertical spindle, an intermediate vertical spindle disposed between said first and second spindles, means journaling said three spindles on said frame, first, second and intermediate horizontal driven pulleys mounted respectively on said first, second and intermediate spindles, said driven pulleys being disposed in a common plane generally alined with said idler pulleys, and an endless belt extending around said driving pulley, around a first one of said idler pulleys, around said intermediate driven pulley, around said first driven pulley, across said intermediate driven pulley, around said second driven pulley, back around said intermediate pulley, around the other idler pulley and back to said driving pulley, said belt being twisted along the section extending between said intermediate pulley and said other idler pulley, and means for turning said driving pulley in a direction to advance said belt from the driving pulley toward said other idler pulley whereby the twist is in a slack portion of the belt.

5. For use with a tractor having a horizontal power driven shaft, a vertical driving pulley secured to said shaft and two laterally spaced idler pulleys mounted on a shaft extending transversely of said power driven shaft and disposed beneath said driving pulley, the combination of, a frame adapted to be attached to said tractor, a first vertical spindle, a second vertical spindle, an intermediate vertical spindle disposed between said first and second spindles, means journaling said three spindles on said frame, first, second and intermediate horizontal driven pulleys mounted respectively on said first, second and intermediate spindles, said driven pulleys being disposed in a common plane generally alined with said idler pulleys, and an endless belt extending around said driving pulley, around a first one of said idler pulleys, around said intermediate driven pulley, around said first driven pulley, across said intermediate driven pulley, around said second driven pulley, back around said intermediate pulley, around the other idler pulley and back to said driving pulley, said belt being twisted along the section extending between said intermediate pulley and said other idler pulley.

6. For use with a tractor having a horizontal power driven shaft and a vertical driving pulley on said shaft, the combination of, a frame adapted to be attached to the tractor, three generally vertical spindles journaled on said frame and horizontally and vertically spaced from said pulley, three driven pulleys, one secured to each of said spindles and disposed in a common plane below said driving pulley, two idler pulleys mounted on a shaft extending transversely of said driven shaft and laterally spaced apart a distance correlated with the diameter of said driving pulley, said idler pulleys being disposed beneath said driving pulley and being generally horizontally alined with said driven pulleys, and an endless belt extending around said driving pulley, around a first one of said idler pulleys, around a first one of said driven pulleys, around a second one of said driven pulleys, across said first driven pulley, around the third driven pulley, back around said first driven pulley, around the second idler pulley and back to said driving pulley.

7. For use with a tractor having a horizontal power driven shaft, a vertical driving pulley secured to said shaft and two laterally spaced idler pulleys mounted on a shaft extending transversely of said power driven shaft and disposed beneath said driving pulley, the combination of, a frame adapted to be attached to said tractor, a first vertical spindle, a second vertical spindle, an intermediate vertical spindle disposed between said first and second spindles, means journaling said three spindles on said frame, first, second and intermediate horizontal driven pulleys mounted respectively on said first, second and intermediate spindles, said driven pulleys being disposed in a common plane generally alined with said idler pulleys, and an endless belt extending around said driving pulley, around a first one of said idler pulleys, around said intermediate driven pulley, around said first driven pulley, across said intermediate driven pulley, around said second driven pulley, back around said intermediate pulley, around the other idler pulley and back to said driving pulley.

8. For use with a power source and a driving pulley turned by said source, the combination of, a frame adapted to be associated with said power source, a first vertical spindle, a second vertical spindle, an intermediate vertical spindle disposed between said first and second spindles, means journaling said three spindles on said frame, first, second and intermediate horizontal driven pulleys mounted on said first, second and intermediate spindles respectively, said driven pulleys being disposed in a common plane, an endless belt extending around said driving pulley and having a portion disposed in said plane and extending from said driving pulley, around said intermediate driven pulley, around said first driven pulley, across said intermediate driven pulley, around said second driven pulley, back around said intermediate driven pulley and back to said driving pulley, said belt being twisted along one of the sections extending between said driving pulley and said intermediate pulley, and means for turning said driving pulley in a direction to advance said belt from the driving pulley toward the twisted section whereby the twist is in a slack portion of the belt.

9. For use with a power source and a driving pulley turned by said source, the combination of, a frame adapted to be associated with said power source, a first vertical spindle, a second vertical spindle, an intermediate vertical spindle disposed between said first and second spindles, means journaling said three spindles on said frame, first, second and intermediate horizontal driven pulleys mounted on said first, second and intermediate spindles respectively, said driven pulleys being disposed in a common plane, and an endless belt extending around said driving pulley and having a portion disposed in said plane and extending from said driving pulley, around said intermediate driven pulley, around said first driven pulley, across said intermediate driven pulley, around said second driven pulley, back around said intermediate driven pulley and back to said driving pulley.

References Cited in the file of this patent

UNITED STATES PATENTS

| 1,302,222 | Rivett | Apr. 29, 1919 |

FOREIGN PATENTS

| 420,359 | Great Britain | Sept. 15, 1933 |